(12) United States Patent
Dobner et al.

(10) Patent No.: US 6,874,084 B1
(45) Date of Patent: Mar. 29, 2005

(54) METHOD AND APPARATUS FOR ESTABLISHING A SECURE COMMUNICATION CONNECTION BETWEEN A JAVA APPLICATION AND SECURE SERVER

(75) Inventors: Edward Joseph Dobner, Raleigh, NC (US); David Gerard Kuehr-McLaren, Apex, NC (US); Anthony Joseph Nadalin, Austin, TX (US); Xiaoyan Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/562,196

(22) Filed: May 2, 2000

(51) Int. Cl.[7] ................................................ H04L 9/00
(52) U.S. Cl. ........................................ 713/156; 709/223

(58) Field of Search ................................. 713/156, 200, 713/155, 201; 709/223, 227, 228, 229

(56) References Cited

U.S. PATENT DOCUMENTS

| 6,105,131 A | * | 8/2000 | Carroll | ........................ 713/155 |
| 6,223,287 B1 | * | 4/2001 | Douglas et al. | ............. 713/178 |
| 6,598,167 B2 | * | 7/2003 | Devine et al. | .............. 713/201 |

* cited by examiner

*Primary Examiner*—Kim Vu
*Assistant Examiner*—Thanhnga Truong
(74) *Attorney, Agent, or Firm*—Duke W. Yee; Jeffrey S. LaBaw; Stephen J. Walder, Jr.

(57) ABSTRACT

A method and apparatus for establishing a secure communication connection between a Java application or applet and a secure server is provided. An HTTPS handler is provided that may be used by Java applications or applets to establish secure communication connections with secure Web servers.

46 Claims, 8 Drawing Sheets

METHOD AND APPARATUS FOR ESTABLISHING A SECURE COMMUNICATION CONNECTION BETWEEN A JAVA APPLICATION AND SECURE SERVER

BACKGROUND OF THE INVENTION

1. Technical Field

The present invention is directed to a method and apparatus for establishing a secure communication connection over a network. In particular, the present invention is directed to a method and apparatus for establishing a secure communication connection between a Java application running on a client device and a secure network server using a secure communication protocol.

2. Description of Related Art

The Internet is increasingly being used as a mechanism by which confidential transactions are conducted. For example, the Internet is increasingly being used in electronic commerce to provide individuals the ability to purchase items using their credit cards, and such. With increased use of the Internet in confidential transactions, the demand for secure communication connections through which to conduct these confidential transactions also increases.

Traditionally, these secure communication connections are created using HyperText Markup Language (HTML) documents and the HyperText Transport Protocol Secure (HTTPS) protocol. HTML is a document format used on the World Wide Web (the Web). With HTML, web pages are built with HTML tags, or codes, embedded in the text. HTML defines the page layout, fonts and graphic elements as well as the hypertext links to other documents on the Web. Each link contains the Universal Resource Locator (URL), or address, of a Web page residing on the same server or any server worldwide.

HTTPS is one of the protocols for accessing a secure Web server. HTTPS is a unique combination of the Secure Socket Layer (SSL) and HTTP protocols. SSL is a protocol that was designed to ensure that data transfers between a client and a server remain secret, and it also allows the client to authenticate the identity of the server to prevent impersonation attacks. SSL can be used with most any Internet protocol, such as Simple Mail Transport Protocol (SMTP) or File Transport Protocol (FTP). Today, SSL is mainly used for securing transactions on the Web. SSL uses a mechanism known as public key encryption. Digital keys are generated as random combinations of complex mathematical expressions along with a series of primary numbers. These combinations of values are extremely difficult to guess because of the sheer number of possible combinations.

HTTPS behaves just like the HTTP protocol, but requires the SSL protocol to safeguard any data that is exchanged. The conversation between an HTTPS enabled client device and a secure Web server starts as a normal readable transaction. However, before data is transmitted over the Internet, SSL protocol stack takes over and scrambles the data according to the digital keys the browser and the server agree to use. When the sensitive information reaches the other side it is unscrambled and processed as readable text. Anyone who may be watching the conversation just sees what looks like gibberish.

Using HTTPS in the URL, e.g. "https:// . . . ", instead of HTTP directs the message to a secure port number rather than the default Web port number of 80. The session is then managed by a security protocol, such as SSL, that encrypts and decrypts messages for online transmission.

Increasingly, Java applications and applets, i.e. small application programs, are being hosted by Web servers to provide a platform independent mechanism by which the Web servers may share programs with client devices. Java is a programming language for Internet and intranet applications that was created by the Sun Corporation. Java programs can be called from within HTML documents or launched stand alone.

Java is an interpreted language that uses an intermediate language. The source code of a Java program is compiled into "byte code, "which cannot be run by itself. The byte code must be converted into machine code at runtime. Upon finding a Java applet, a Web browser on a client device switches to its Java interpreter (Java Virtual Machine) which translates the byte code into machine code and runs it. This means Java programs are not dependent on any specific hardware and will run in any computer with the Java Virtual Machine.

Java applications and applets may be created using, for example, the Java Development Kit (JDK). JDK provides the java.net package which provides a Java application or applet the ability to create its own network connections by initializing URL objects (url=URL("http://www.ibm.com"). However, JDK, and Java applications and applets in general, do not provide any support for secure communication connections. For example, Java and JDK do not provide support for the HTTPS protocol.

Web servers must still rely on HTML documents and a Web browser's ability to create secure communication connections. This is undesirable since many Internet/Intranet applications need to use Java applets or applications to provide more sophisticated and powerful front ends to users, and take advantage of Java's platform independent nature. Therefore, it would be advantageous to have a method and apparatus for establishing a secure communication connection between a Java application and a network server.

SUMMARY OF THE INVENTION

The present invention provides a method and apparatus for establishing a secure communication connection between a Java application or applet and a secure server. In particular, the present invention provides a secure connection handler that may be used by platform independent applications or applets to setup secure communication connections with secure Web servers.

The method and apparatus of the present invention provides a mechanism in which a secure connection is established between a client device and a secure Web server. A platform independent application is downloaded from the secure Web server and executed on a client device. The secure connection handler, which may be downloaded with the platform independent application or may already be resident on the client device, establishes a secure communication connection between the platform independent application and the secure Web server. The establishment of a secure communication connection directly between the platform independent application and the secure Web server may include the authenticating of the secure Web server and use of public and secret keys to encrypt the information sent over the secure communication connection.

In a preferred embodiment, the platform independent application is a Java application or applet. The secure connection handler, in the preferred embodiment, is an HTTPS handler that establishes an HTTPS connection between the Java application or applet and a secure Web server directly, i.e. without having to be routed through a web browser. The HTTPS handler preferably is a Java applet that makes use of an HTTPSURLConnection class, Secure-Glue class, HTTPSClient class, and new SSLsocket class.

With the method and apparatus of the present invention, secure Web servers may use platform independent applications to provide a front end interface for communication with users of client devices while maintaining a secure communication connection. This greatly enhances the portability, flexibility and features of the front ends to client devices operating under different platform environments.

Other features and advantages of the present invention will be described in the following detailed description or will become apparent to those of ordinary skill in the art in view of the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
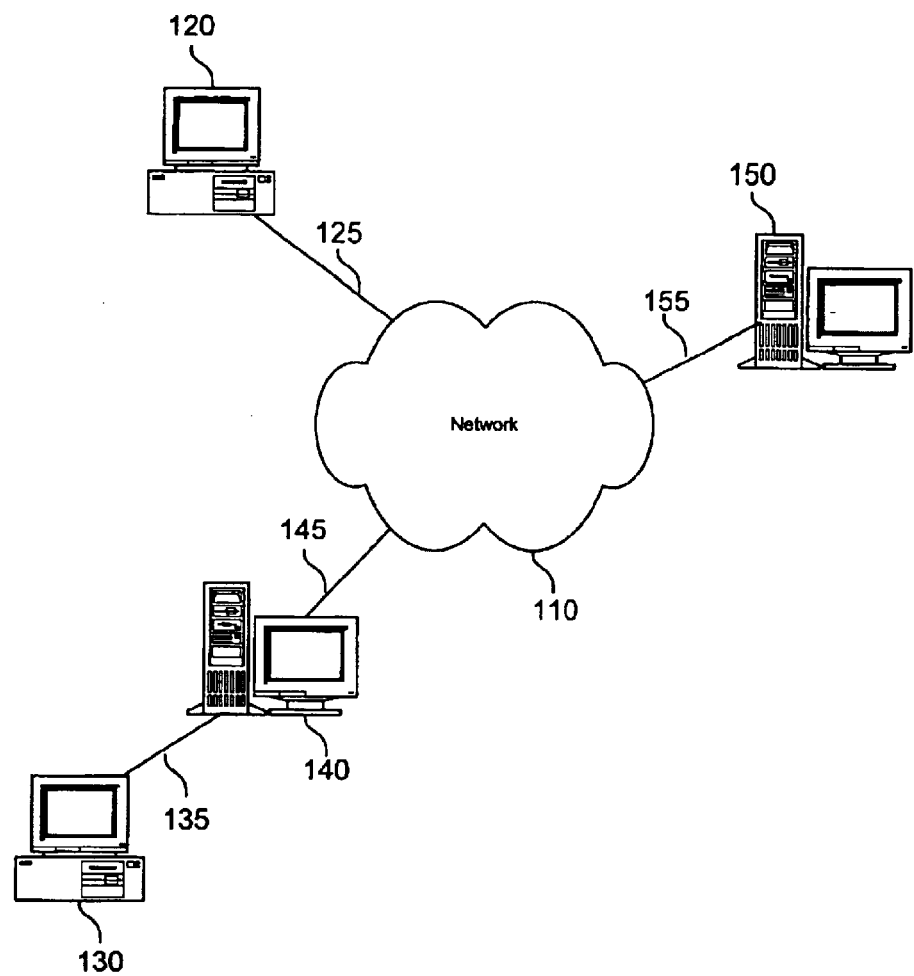
FIG. 1 is an exemplary diagram of a distributed data processing system in which the present invention may be implemented.

FIG. 1 is an exemplary block diagram illustrating a distributed data processing system 100 in which the present invention may be implemented. As shown in FIG. 1, the system 100 includes at least one network 110, one or more client devices 120 and 130, and one or more servers 140 and 150. Any number of networks, client devices and servers may be used in the distributed data processing system 100 according to the present invention.

The client devices 120, 130 communicate with and exchange information with the servers 140, 150, as is well known in the art. The client devices 120, 130 may connect directly to a server, such as shown with client device 130 and server 140, or may connect to the server via the network 110, such as shown with client device 120 and server 150.

The client devices 120, 130 are any type of computing device that may communicate with servers 140, 150 over communication links 125, 135, 145 and 155. For example, the client devices 120, 130 may be personal computers, workstations, personal digital assistants (PDAs), computerized telecommunications equipment, WebTV™ devices, portable computers with wired or wireless communication capability, and the like.

The communication links 125, 135, 145 and 155 may be any type of wired or wireless communication link that provides a medium by which information may be transmitted. For example, the communication links 125, 135, 145 and 155 may be landline telephone wires, coaxial cable communication links, cellular communication links, satellite communication links, fiber optical communication links, infrared communication links, radio communication links, and the like.

The network 110 may be any type of communication network over which information may be transmitted. For example, the network 110 may be a data network, telecommunications network, the Internet, an intranet, wide area network (WAN), local area network (LAN), or the like. The network 110 may be a single network or a plurality of networks of the same or different types. In a preferred embodiment of the present invention, the network 110 is the Internet.

The servers 140, 150 may be any type of computing device that is shared by one or more client devices 120, 130. The servers 140, 150 store information that may be accessed by authorized client devices 120, 130. For example, the servers 140, 150 may store computer files, data files, application programs, applets, and the like, that may be utilized by the client devices 120, 130.

The servers 140, 150 may be secure servers or unsecured servers. In a preferred embodiment of the present invention, the servers 140 and 150 are secure servers requiring secure communication connections for the exchange of information with the client devices 120, 130. In particular, a preferred embodiment of the present invention makes use of secure Web servers 140 and 150.

For purposes of the following explanation of the exemplary embodiments of the present invention, it will be assumed that the client device 120 communicates with the secure Web server 150 via the network 110 using the Transmission Control Protocol/Internet Protocol (TCP/IP) suite of protocols, of which HyperText Transport Protocol (HTTP) and Hypertext Transport Protocol Secure (HTTPS) are included. However, as will be apparent to those of ordinary skill in the art, other types of protocols, such as UDP, may be used without departing from the spirit and scope of the present invention.

When a client device 120 wishes to communicate with a secure Web server 150, for example, the client device 120 initiates a Web browser program resident on the client device 120. The Universal Resource Locator (URL) for the secure Web server 150 is entered into the Web browser program either by a user of the client device 120 or automatically by an application program running on the client device 120. In a preferred embodiment of the present invention, the URL for the secure Web server 150 identifies a secure communication protocol, such as HTTPS. For example, the URL may take the form of "https://www.ibm.com" where "https" identifies the secure communication protocol being used to create a communication connection with the secure Web server identified as "www.ibm.com."

In response to receiving a URL, the Web browser program initiates a URL request that requests access to the secure Web server 150. Upon receiving a reply from the secure Web server 150, the secure Web server 150 is authenticated, an encryption key is sent to the secure Web server 150 for use during the session, and a secure communication connection between the secure Web server 150 and the client device 120 for HTML pages is established.

Once the secure HTML page communication connection is established, the secure Web server 150 may send a set of Java classes or a Java Archive (JAR) file to the client device 120, either automatically or at the request of the client device 120. JAR is a file format used to distribute Java applications. It contains all the resources required to install and run a Java program in a single compressed file. Alternatively, a Java application that is already resident on the client device 120 may be executed, either automatically or at the request of a user of the client device 120 or another application running on the client device 120. For purposes of the following discussion, it will be assumed that the Java application is downloaded from the secure Web server 150 as a JAR file.

Included in the JAR file is a secure Java communication connection establishing application or set of Java classes, hereafter referred to as the secure connection handler. Alternatively, the secure connection handler may be embodied as a plug in device for a Web browser, a separate application resident on the client device 120, or as a portion of a Java application or applet.

In a preferred embodiment, the secure connection handler is an HTTPS handler downloaded when the JAR file is downloaded and used as a plug-in device to the Web browser. The HTTPS handler provides a mechanism by which Java applications and Java applets can establish secure communication connections with secure Web servers directly using the HTTPS protocol, i.e. without intervention by a web browser. However, other secure protocols may be used without departing from the spirit and scope of the present invention.

The secure connection handler establishes a secure communication connection with a secure Web server by first sending an HTTPS request to the secure Web server. In response, the secure Web server sends a server certificate and a server public key to the secure connection handler. The secure connection handler then verifies the server certificate. In a preferred embodiment, the secure connection handler verifies the server certificate by comparing the received server certificate with an trusted server certificate database associated with the secure connection handler, as will be discussed in more detail hereafter.

If the received server certificate is verified, the secure connection handler responds to the secure Web server with a session key encrypted with the server public key. Thereafter, any data transmissions between the secure Web server and the client device on which the secure connection handler resides, will be encrypted using the session key. In this way, a secure communication connection is established between the secure Web server and the secure connection handler on the client device. Thereby, any Java applications or applets that are run on the client device will communicate with the secure Web server using the secure connection established by the secure connection handler.

Figure 2:
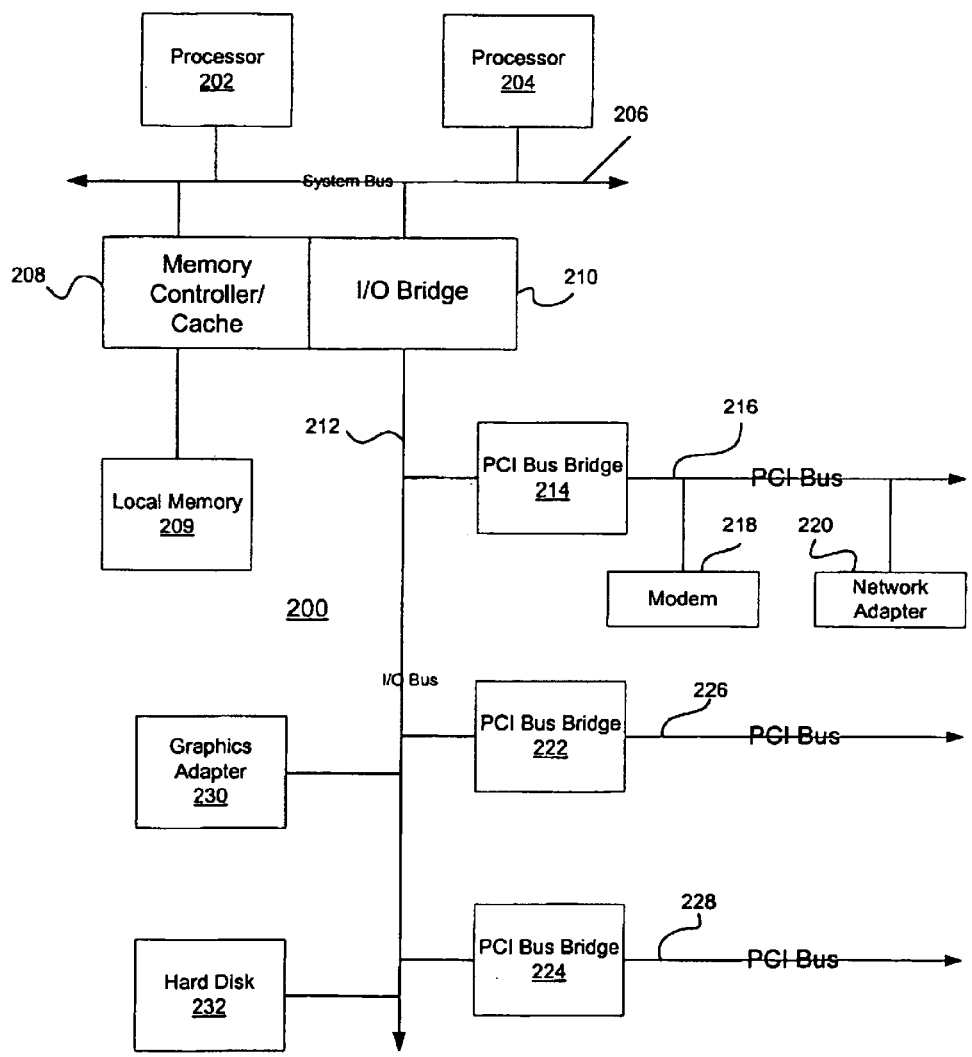
FIG. 2 is an exemplary block diagram of a server according to the present invention.

FIG. 2 is an exemplary block diagram of a data processing system that may be implemented as a server, such as secure Web server 150 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 120–140 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

The JAR file that is downloaded to the client device 120, for example, is stored on the server and is downloaded when a communication connection is established with the server. The download of the JAR file may be automatic, in response to a selection of a hyperlink from an HTML document, or the like. The JAR file, in a preferred embodiment of the invention, includes the secure connection handler of the present invention. However, as mentioned above, the secure connection handler may be stored on the client device and may be implemented in response to the receipt of a JAR file.

Figure 3:
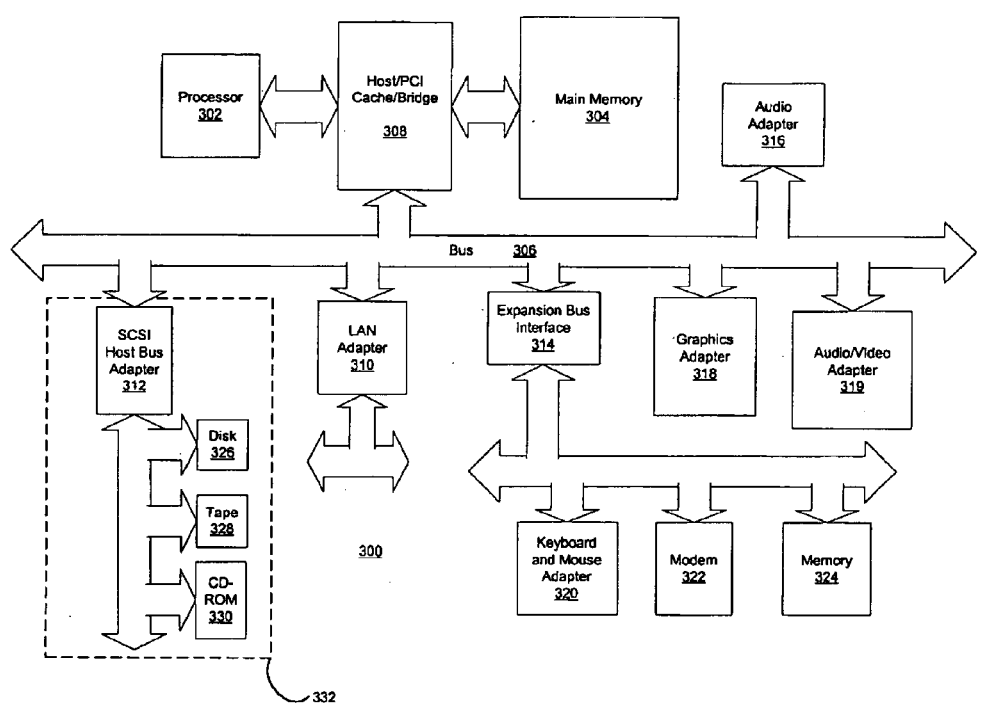
FIG. 3 is an exemplary block diagram of a data processing system in which the present invention may be implemented.

FIG. 3 is an exemplary block diagram illustrating a data processing system in which the present invention may be implemented. Data processing system 300 is an example of a client computer, such as client device 120 in FIG. 1. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The data processing system 300 executes the Java application or applet received in the JAR file from the secure Web server, along with the secure connection handler of the present invention. Alternatively, as mentioned above, the Java application and the secure connection handler may be resident as one or more classes stored in memory on the data processing system 300 or on a peripheral device of the data processing system 300.

Figure 4:
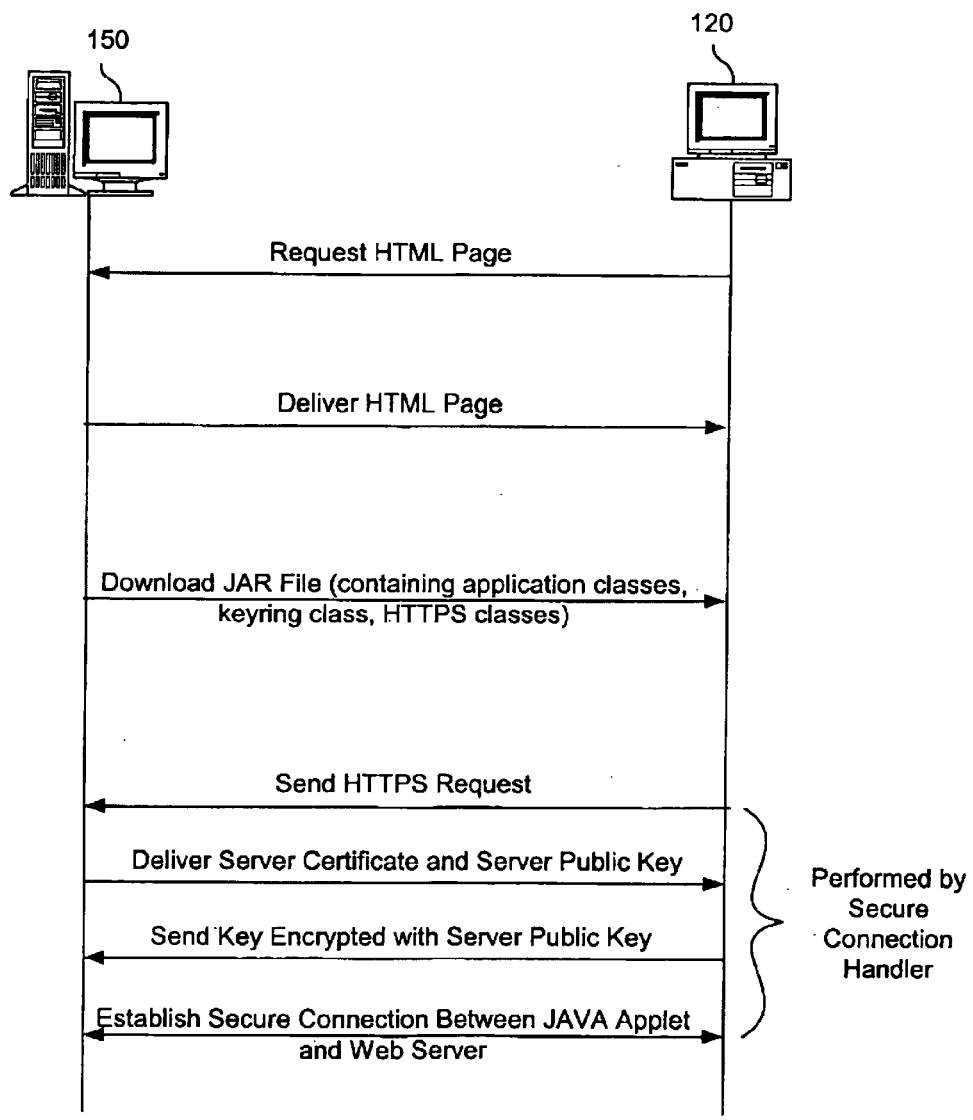
FIG. 4 is an exemplary message flow diagram illustrating the interaction between a client device and a secure server, in accordance with the present invention.

FIG. 4 is an exemplary data flow diagram illustrating the process of setting up a secure communication connection between a client device 120 and a secure Web server 150 in accordance with the present invention. As shown in FIG. 4, the process starts with the client device 120 sending an HTML page request to the secure Web server 150. In response, the secure web server 150 sends the requested HTML page to the client device 120. In addition to the requested HTML page, the secure web server 150 may send a JAR file containing the Java application classes, keyring class, and the like.

The JAR file is only provided if the secure web server 150 is verified. In other words, it is verified that the JAR file is downloaded from a known secure web server. The verification may be performed, for example, by way of certificate verification or may be performed by signature verification of the JAR file.

With certificate verification, the client device 120 requests that the secure web server 150 send the client device 120 a server certificate and a public key. The client device 120 verifies the server certificate and, if verified, uses the received public key to encrypt a session key.

The client device 120 may verify the server certificate by comparing the server certificate with a database of trusted server certificates associated with the client device 120. The database of trusted server certificates may be stored, for example, in a memory and may be updated automatically or manually by the user of the client device 120, in a manner known in the art. The server certificate is verified when the comparison to the trusted server certificate database indicates that the server certificate is in the trusted server certificate; database. If not, the server certificate is not verified and a secure communication connection with the secure Web server 150 cannot be established. This may be due to tampering with the data stream by a third party, or the like, which alters the data stream and thus, the server certificate information forwarded by the secure Web server 150.

Once the secure Web server 150 is verified, the client device 120 sends a secret session key encrypted with the public key, to the secure Web server 150. This session key is then used to send and receive HTML documents, HTML data, and the JAR file over a secure communication connection with the secure Web server 150.

Alternatively, the JAR file may be "signed" by the secure web server 150 when the JAR file is sent to the client device 120. The signature on the JAR file is then verified by the client device 120 through, for example, comparison to a trusted server signature database, or the like. For purposes of explanation, the following description will assume that certificate verification is performed to establish a secure communication connection between the web browser and the secure web server 150.

In response to receiving the JAR file, the client device 120, executing the secure connection handler, establishes a secure communication connection between the client device 120 and the secure Web server 150 for the Java application or applet. This is done by sending an HTTPS request to the secure Web server 150, receiving a server certificate and public key from the secure Web server 150, verifying the server certificate, sending a session key encrypted with the public key to the secure. Web server 150, and then using the secret session key for data transmissions between the Java application on the client device 120 and the secure Web server 150. Thus, a secure communication connection is established between the secure Web server 150 and the client device 120 for use with Java applications using the HTTPS protocol.

Figure 5:
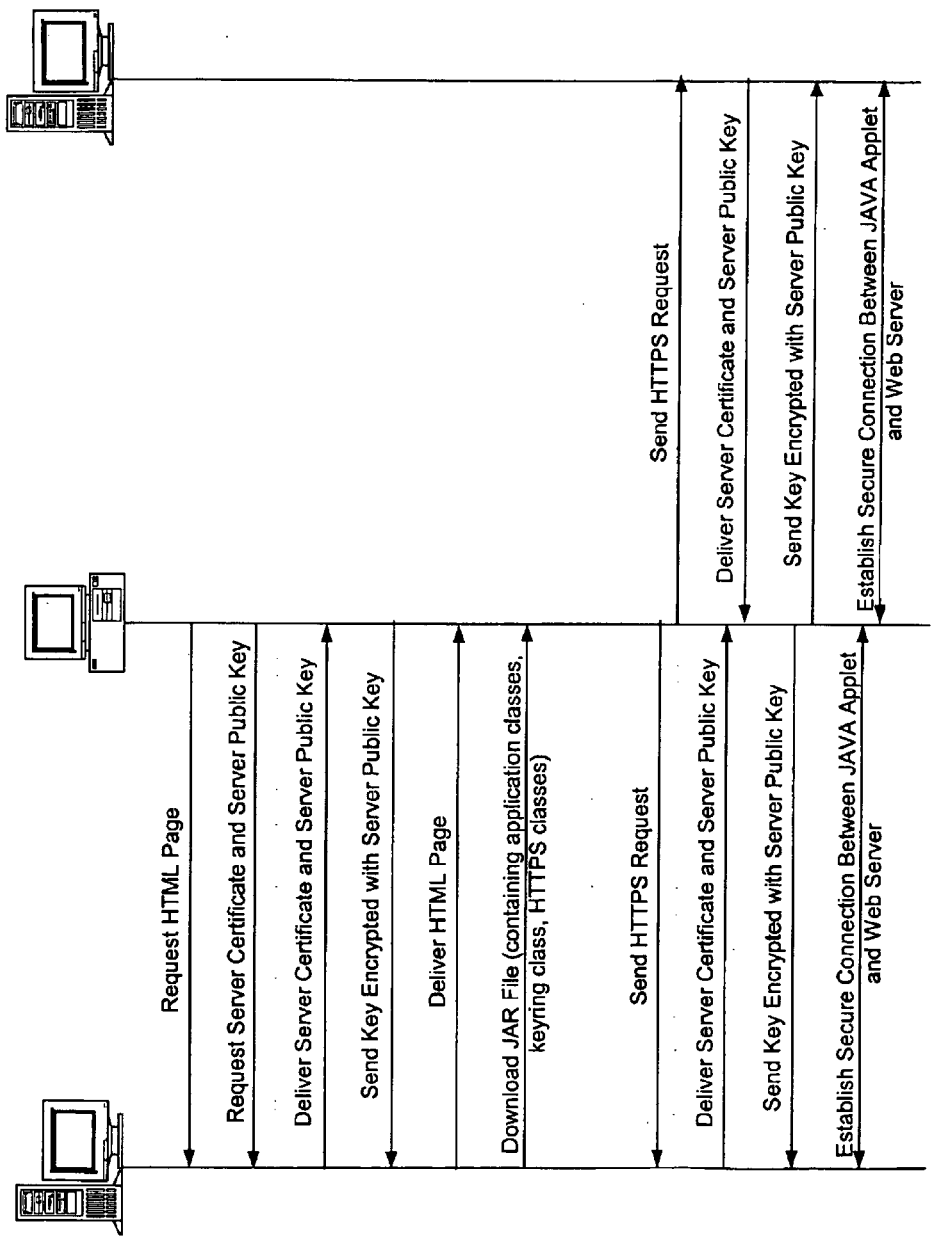
FIG. 5 is an exemplary message flow diagram illustrating the interaction between a client device and multiple secure servers, in accordance with the present invention.

FIG. 5 is an exemplary message flow diagram illustrating the process for establishing multiple secure communication connections between a client device 120 and two or more secure Web servers 140 and 150. As mentioned above, FIG. 5 assumes that certificate verification is performed to establish a secure communication connection. However, signature verification may be used without departing from the spirit and scope of the present invention.

The left side of the message flow diagram in FIG. 5 is similar to the message flow diagram in FIG. 4 using certificate verification as described above and therefore, the details of these messages will not be reiterated here. The right side of the diagram shows essentially the same last four message transmissions as the left side only being performed for a different secure Web server 140.

Traditional Java applets require that communication between the Java application or applet be made with the server from which the Java application or applet was downloaded. Unlike traditional Java applets that are downloaded from a secure Web server, the present secure connection handler is able to create multiple secure communication connections with different secure Web servers 140 and 150. The ability to establish additional secure communication connections comes from the use of server certificates and server certificate verification. As long as each of the servers that are to be communicated with have server certificates that are present in the trusted server certificate database associated with the secure connection handler, the secure connection handler may verify the server certificate and establish a secure communication connection with that server.

In some instances, the secure Web server may be behind a firewall on a proxy server. A firewall is a method for keeping a network secure. It can be implemented in a single router that filters out unwanted packets, or it may use a combination of technologies in routers and hosts. Firewalls are widely used to give users access to the Internet in a secure fashion as well as to separate a company's public Web server from its internal network. They are also used to keep internal network segments secure. For example, a research or accounting subnet might be vulnerable to "snooping" from within the network.

The present invention provides for security of the data transmission between a Java application and a secure Web server even if a firewall is present between the Java application and the secure Web server. With the present invention, client application is able to connect to the, firewall first and then request the proxy to connect the destination Web server.

There are many different types of firewall technology with which the present invention works. The present invention will be described, in an exemplary embodiment, for use with a firewall that supports the CONNECT extension method. With this type of firewall, the client device can specify the host name and port number to connect to in the CONNECT header message, such as CONNECT www.ibm.com:443 HTTP/1.0. The firewall has access to the client proxy request headers, but the session is encrypted. In this way the firewall can monitor the request but not the traffic. Thus, the firewall is only able to access the message headers of messages being passed between the Java application and the secure Web server. In this way, the proxy server is able to examine data packets in the message header to determine if the message may be allowed to pass through the firewall, but is unable to read the data in the body of the message. In this way, anyone that may attempt to circumvent the security of the system by accessing messages through the firewall, will not be able to read the content of the messages, only the header of the message.

The existence of proxy server may be determined based on input from a user of the client device. For example, information could be retrieved from Windows Internet settings. If a firewall exists, the secure connection handler sets proxy information for the firewall proxy server, and uses this information in the message headers of messages transmitted to the secure Web server. The proxy information may include, for example, the proxy server hostname and port number. The message body itself is encrypted in the manner set forth above so that only the client device and the secure Web server are capable of decrypting the message body and interpreting the information stored in the message body. Thus, when a Java application or applet resident on a client device attempts to communicate with a secure Web server that is located behind a firewall, the Java application or applet first executes the secure connection handler of the present invention. The secure connection handler sets the proxy and port number and initializes an HTTPS connection request in the manner set forth above. Thereafter, only the header information of data that is passed to the firewall proxy server is monitored by the firewall. Assuming that the communication connection is authorized by the firewall, the data is passed through the firewall to the secure Web server. The data itself is never decrypted by the firewall.

Figure 6A:
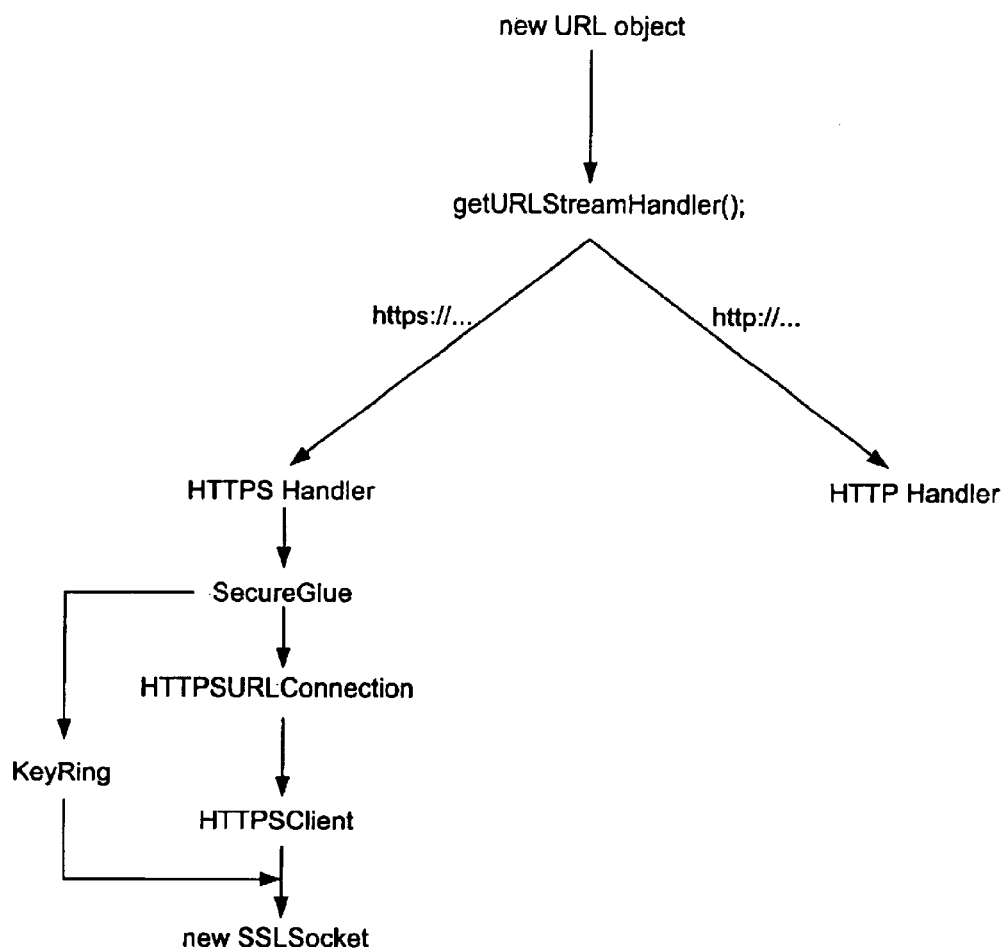
FIG. 6A is an a partial flow diagram of a Java application invoking the secure connection handler of the present invention.

FIG. 6A is an exemplary diagram illustrating a partial flow of a Java application that invokes the secure connection handler, in this example called the HTTPS handler. As shown in FIG. 6A, the Java application first creates a new URL object, such as "https://www.ibm.com." This may be done automatically or in response to an input received from a user.

The Java program then calls getURLStreamHandler( ) which, based on the protocol identifier in the URL, either "https://" or "http://" for example, calls an appropriate URL Stream Handler. If the protocol identifier is "http://" then the communication connection is established in a known manner. If the protocol identifier is "https://" then the secure connection handler of the present invention is called, i.e. HTTPS handler. The HTTPS handler has four main classes: SecureGlue, HTTPSURLConnection, HTTPSClient and new SSLSocket.

The HTTPSURLConnection class extends HttpsURL-Connection class in the JDK java.net package to open an HTTPS connection to remote objects. It requests an HTTPS connection, gets the response, and presents it as a user readable data stream.

SecureGlue initializes the secure connection environment. It sets the KeyRing class and cipher suites to use during the connection.

The KeyRing class is the certificate database embedded in the Java class file. It provides trusted signer and site certificates.

The HTTPSClient opens an HTTPS connection to Web server or proxy server and parses response messages. The new SSLSocket class opens an SSL Socket for communication with the secure Web server.

Figure 6B:
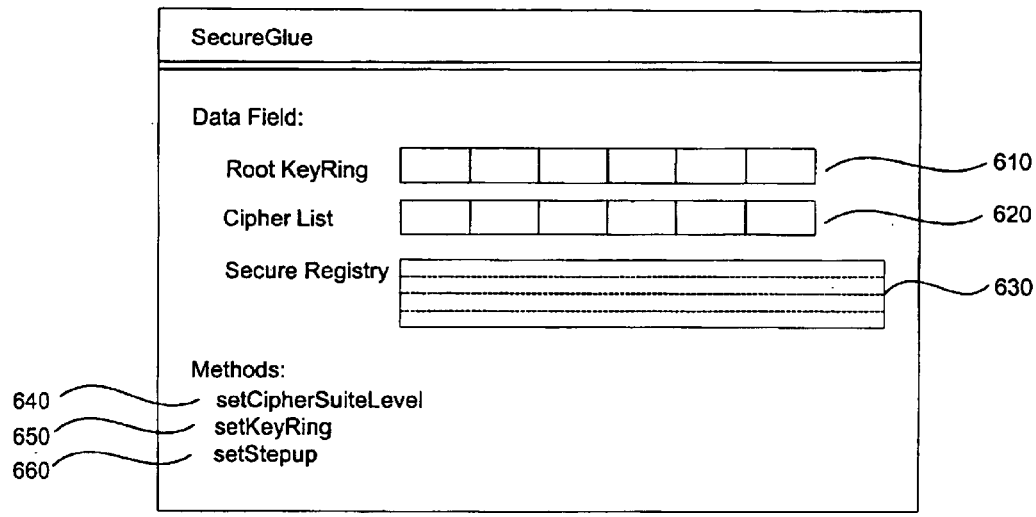
FIG. 6B is an exemplary diagram of the SecureGlue structure in accordance with the present invention.

FIG. 6B is an exemplary diagram of the SecureGlue class structure. As shown in FIG. 6B, the SecureGlue class structure includes a root KeyRing 610, cipher list 620, secure registry 630, setCipherSuiteLevel method 640, setKeyRing method 650, and setStepup method 660.

The root KeyRing 610 is a certificate repository that stores certificates, trusted roots (self-signed certificates of Certificate Authority), and client's private keys. The cipher list 620 is a list of names of cipher sets, for example. SSL_RSA_EXPORT_WITH_RC4_40_MD5 is one of the cipher suites which uses the export version of RSA public key cryptography to authenticate the communication parties' identity, uses 40-bit RC4 for data encryption, and uses MD5 to generate digital signatures. The secure registry 630 is a key-value pair hash table which maintains cryptographic information such as stepup (defined hereafter), keyring, and cipher suite.

The setCipherSuiteLevel method 640 is a method for specifying what level of encryption will be allowed for SSL connections. Because of US export laws regarding cryptography, the allowable cipher suites have been grouped into sets of strong and weak encryption levels. The setCipherSuiteLevel method allows the level of encryption to be set to either strong, weak or none.

The setKeyRing method 650 installs a keyring as the rootKeyRing used during the HTTPS connection. The keyring could be the default keyring which does not contain a specific private key in the package or a new one generated using, for example, the iKeyMan tool.

The setStepup method 660 sets a flag if step-up cryptography is allowed to be used during the connection. Step-up cryptography is the ability of an HTTPS application to recognize that a server has sent a particular type of certificate, i.e. A step-up certificate, that requires a higher level of cryptography to be used during communications with the server from which the certificate was received. For example, the step-up certificate may be a Verisign Global Server ID certificate. The Verisign Global Server ID certificates are only provided to financial institutions and inform client devices that they are authorized to use strong cryptography with the server even though the client device is exporting the information outside the United States. The step-up only involves the exportable cipher suites the client device is permitted to use and the US/Domestic cipher suites the client device tells the server it can use. No changes in the public/private keys or certificates are made.

Initially, the client device sends only the exportable 40-bit cipher suites to the server. If the server sends a certificate that meets the criteria of a step-up certificate, e.g., the server is associated with a financial institution, then the client initiates a second handshake on the same socket connection. The second handshake contains the US/Domestic cipher suites capable of doing 56 bit (Data Encryption Standard), 128 bit (RC4) and 196 bit (Triple Data Encryption Standard) encryption. The server selects one of these stronger cipher suites for the bulk data encryption. Actual application data begins to flow after the completion of the second handshake.

Figure 6C:
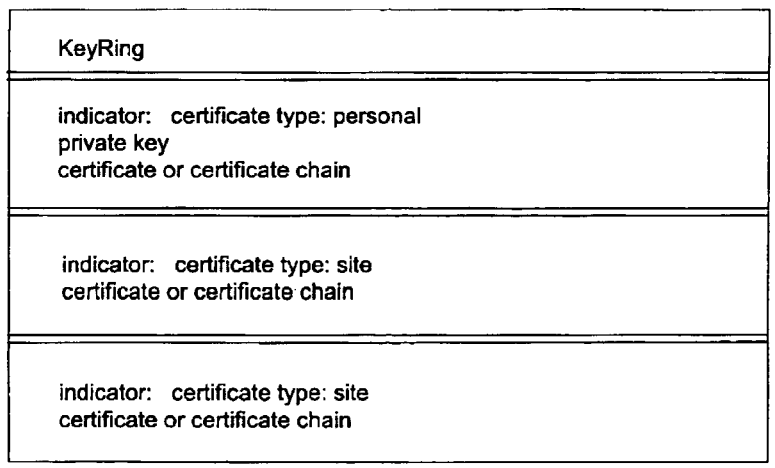
FIG. 6C is an exemplary diagram of the KeyRing structure in accordance with the present invention.
Figure 7:
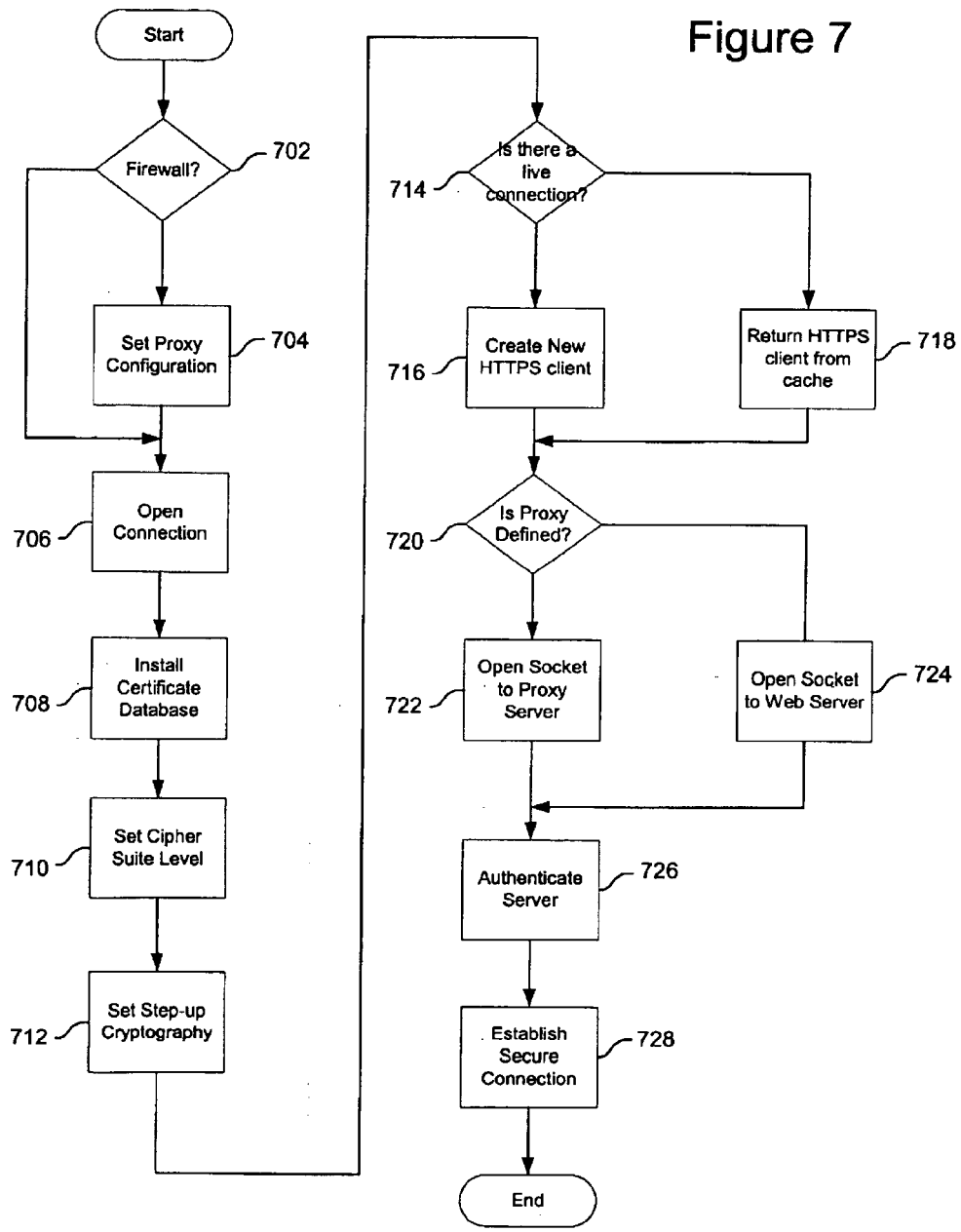
FIG. 7 is a flowchart outlining an exemplary operation of the present invention.

FIG. 6C is an exemplary diagram of the KeyRing class structure. As shown in FIG. 6, the KeyRing class structure stores information for a plurality of certificates. The certificates are stored in a structure that is essentially an array (or chain) of entries. Each entry includes indicators, private keys, and a certificate or certificate chain. FIG. 7 is a flowchart outlining an exemplary operation of the secure connection handler according to the present invention. As shown in FIG. 7, the operation starts with the secure connection handler determining if a firewall exists (step 702). If so, the proxy configuration is set (step 704). This may include setting, for example, the proxy host name and port number.

Thereafter, or if a firewall does not exist, an open connection is established with the secure Web server (step 706). In establishing an open connection, the HTTP request message, which includes header fields and entity body as defined in HTTP/1.0, for example, is processed.

After an open connection is established with the secure Web server, the trusted server certificate database is installed (step 708) and the cipher suite level is set (step 710), e.g. domestic, export, or none, Next, the cryptography is set, i.e. the session key (step 712). The trusted server certificate database may be the default certificate database within the secure connection handler package, or one that is generated by using IBM's digital certificate management tool iKeyman, for example. Installation of the trusted server certificate may be performed through the SecureGlue interface.

The cipher suite level may also be done through SecureGlue interface. Because of US export laws regarding cryptography, the allowable cipher suites have been grouped into sets of strong and weak encryption levels. Through this method, the level of encryption that will be used may be set.

It is then determined if there is already a secure connection established with the secure Web server (step 714). If so, an HTTPS client has already been established and the information pertaining to the HTTPS client is retrieved from cache memory (step 716). If not, a new HTTPS client is created (step 718). This may be performed, for example, by the HTTPSURLConnection class.

A determination is then made as to whether or not a proxy has been defined in step 704 (step 720). If so, a socket is opened to the proxy server (step 722). If not, a socket is opened to the secure Web server (step 724). This may be performed, for example, by the HTTPSClient class. A socket is opened, connected to the specified remote port at remote IP address, and bytes of data are written to the socket.

The secure Web server is then authenticated (step 726) and a secure connection is established with the secure Web server (step 728), assuming the server is authenticated. These steps may include, for example, the client requesting a server certificate and comparing the received server certificate to the trusted server certificate database within the secure connection handler package. If the server certificate is a step-up certificate and the setStepup method has set the flag, a step-up operation is performed to use strong cryptography for the application data transmission, as described above.

It should be noted that the order of the steps set forth in FIG. 7 is not intended to impart any particular order. Rather, those of ordinary skill in the art will recognize that some of the steps may be implemented in parallel. For example, steps 708–712 may be performed in parallel with steps 714–724. With the present invention, using the method set forth in FIG. 7, a secure communication connection may be established between a platform independent application or applet, such as a Java application or applet, and a secure Web server. In this way, applications and applets may be created using a platform independent programming language while still being able to take advantage of secure communication connections provided by the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art.

For example, although the depicted embodiment is directed towards Java applications and applets, the processes of the present invention may be applied to other programming languages and environments that process instructions which are nonspecific to a computer on which the instructions are to be executed. In such a case, a virtual machine on the computer may interpret the instructions or send the instructions to a compiler to generate code suitable for execution by the computer on which the virtual machine is located.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for creating a secure connection to a server, comprising:
    within a platform independent applet, initializing a secure socket connection request via HyperText Transport Protocol (HTTP);
    using a certificate database to authenticate the server; and
    creating the secure connection between the platform independent applet and the server using HyperText Transport Protocol Secure (HTTPS) if the server is authenticated, wherein the secure connection between the platform independent applet and the server is created without intervention by a Web browser.

2. The method of claim 1, further comprising:
    receiving a server public key from the server; and
    sending a session key, encrypted with the server public key, to the server, wherein the secure connection makes use of the session key to encrypt data.

3. The method of claim 1, wherein the secure connection between the platform independent applet and the server is created using a secure connection handler, wherein the secure connection handler includes the following Java classes: HTTPSClient, HTTPSURLConnection, new SSLsocket and SecureGlue.

4. The method of claim 1, wherein using the certificate database to authenticate the server includes:
    receiving a certificate from the server;
    determining if the certificate is a step-up certificate; and if the certificate is a step-up certificate, using a strong cryptography to encrypt data being sent to the server.

5. A method of creating a secure connection between a platform independent application and a server using HTTPS, comprising:
    sending an HTTPS secure connection request to the server from the platform independent application;
    receiving a server identification;
    authenticating the server based on the server identification; and
    establishing the HTTPS secure connection between the platform independent application and the server if the server is authenticated, wherein the HTTPS secure connection between the platform independent application and the server is established without intervention by a Web browser.

6. The method of claim 5, further comprising:
    receiving a server public key from the server; and
    sending a session key, encrypted with the server public key, to the server, wherein the secure connection between the platform independent application and the server makes use of the session key to encrypt data.

7. The method of claim 5, wherein authenticating the server based on the server identification includes comparing the server identification to trusted server identifiers in an trusted server identifier database.

8. The method of claim 5, wherein the server identifier is a server certificate.

9. The method of claim 5, wherein the HTTPS secure connection is established using a secure connection handler, wherein the secure connection handler includes the following Java classes: HTTPSClient, HTTPSURLConnection, new SSLsocket and SecureGlue.

10. The method of claim 5, wherein the platform independent application is one of a Java application and a Java applet.

11. The method of claim 5, further comprising:
    downloading the platform independent application prior to establishing the HTTPS secure connection between the platform independent application and the server.

12. The method of claim 11, wherein the platform independent application is downloaded from the server.

13. The method of claim 11, wherein the platform independent application is downloaded from a server different from the server with which the HTTPS secure connection is established.

14. The method of claim 11, wherein the platform independent application is downloaded as a JAR file.

15. The method of claim 11, wherein the platform independent application is downloaded as a set of Java classes.

16. The method of claim 5, wherein the server is located behind a firewall, and wherein only message headers of messages sent via the secure connection are able to be examined by the firewall and message bodies of the messages sent via the secure connection remain encrypted.

17. The method of claim 5, wherein sending an HTTPS secure connection request to the server from the platform independent application is performed by an HTTPSURLConnection class of a secure connection handler.

18. The method of claim 5, wherein the HTTPS secure connection is initialized by a SecureGlue class of a secure connection handler and is established using an HTTPSClient class of the secure connection handler.

19. The method of claim 5, wherein authenticating the server is performed using a KeyRing class of a secure connection handler.

20. A computer program product in a computer readable medium for establishing an HTTPS secure connection between a platform independent application and a server, comprising:
    first instructions for sending an HTTPS secure connection request to the server from the platform independent application;
    second instructions for receiving a server identification;
    third instructions for authenticating the server based on the server identification; and
    fourth instructions for establishing the HTTPS secure connection between the platform independent application and the server if the server is authenticated, wherein the HTTP secure connection between the platform independent application and the server is established without intervention by a Web browser.

21. The computer program product of claim 20, further comprising:
    fifth instructions for receiving a server public key from the server; and
    sixth instructions for sending a session key, encrypted with the server public key, to the server, wherein the secure connection between the platform independent application and the server makes use of the session key to encrypt data.

22. The computer program product of claim 20, wherein the third instructions include instructions for comparing the server identification to trusted server identifiers in an trusted server identifier database.

23. The computer program product of claim 20, wherein the server identifier is a server certificate.

24. The computer program product of claim 20, wherein the first instructions include instructions for implementing an HTTPSURLConnection class, the third instructions include instructions for implementing a KeyRing class, and the fourth instructions include instructions for implementing an HTTPSClient class and a new SSLsocket class.

25. The computer program product of claim 20, wherein the platform independent application is one of a Java application and a Java applet.

26. The computer program product of claim 20, further comprising:
fifth instructions for downloading the platform independent application prior to establishing the HTTPS secure connection between the platform independent application and the server.

27. The computer program product of claim 26, wherein the platform independent application is downloaded from the server.

28. The computer program product of claim 26, wherein the platform independent application is downloaded from a server different from the server with which the HTTPS secure connection is established.

29. The computer program product of claim 26, wherein the platform independent application is downloaded as a JAR file.

30. The computer program product of claim 26, wherein the platform independent application is downloaded as a set of Java classes.

31. The computer program product of claim 20, wherein the first instructions include an HTTPSURLConnection class.

32. The computer program product of claim 20, wherein the fourth instructions include a SecureGlue class and an HTTPSClient class.

33. The computer program product of claim 20, wherein the third instructions include a KeyRing class.

34. The computer program product of claim 20, wherein the third instructions include:
determining if the server identification is a step-up certificate; and
if the server identification is a step-up certificate, using a strong cryptography to encrypt data being sent to the server.

35. A secure connection handler for creating an HTTPS secure connection between a platform independent application and a server, comprising:
means for sending an HTTPS secure connection request to the server from the platform independent application;
means for receiving a server identification;
means for authenticating the server based on the server identification; and
means for establishing the HTTPS secure connection between the platform independent application and the server if the server is authenticated, wherein the HTTPS secure connection between the platform independent application and the server is established without intervention by a Web browser.

36. The secure connection handler of claim 35, further comprising:
means for receiving a server public key from the server; and
means for sending a session key, encrypted with the server public key, to the server, wherein the secure connection between the platform independent application and the server makes use of the session key to encrypt data.

37. The secure connection handler of claim 35, wherein the means for authenticating the server based on the server identification includes means for comparing the server identification to trusted server identifiers in an trusted server identifier database.

38. The secure connection handler of claim 35, wherein the server identifier is a server certificate.

39. The secure connection handler of claim 35, wherein the HTTPS secure connection is established using a secure connection handler, wherein the secure connection handler includes the following Java classes: HTTPSClient, HTTPSURLConnection, new SSLsocket and SecureGlue.

40. The secure connection handler of claim 35, wherein the platform independent application is one of a Java application and a Java applet.

41. The secure connection handler of claim 35, further comprising:
means for downloading the platform independent application prior to establishing the HTTPS secure connection between the platform independent application and the server.

42. The secure connection handler of claim 41, wherein the platform independent application is downloaded from the server.

43. The secure connection handler of claim 41, wherein the platform independent application is downloaded from a server different from the server with which the HTTPS secure connection is established.

44. The secure connection handler of claim 41, wherein the platform independent application is downloaded as a JAR file.

45. The secure connection handler of claim 41, wherein the platform independent application is downloaded as a set of Java classes.

46. The secure connection handler of claim 35, wherein the means for authenticating the server determines if the server identification is a step-up certificate and, if the server identification is a step-up certificate, the means for establishing the HTTPS secure connection uses a strong cryptography to encrypt data being sent to the server.

* * * * *